United States Patent [19]

Kagawa

[11] Patent Number: 4,774,675
[45] Date of Patent: Sep. 27, 1988

[54] MONITOR DEVICE OF INJECTION MOLDING MACHINE

[75] Inventor: Yoshimasa Kagawa, Hachioji, Japan

[73] Assignee: Fanuc Ltd, Minamitsuru, Japan

[21] Appl. No.: 882,903

[22] PCT Filed: Oct. 29, 1985

[86] PCT No.: PCT/JP85/00600

§ 371 Date: Jun. 30, 1986

§ 102(e) Date: Jun. 30, 1986

[87] PCT Pub. No.: WO86/02592

PCT Pub. Date: May 9, 1986

[30] Foreign Application Priority Data

Oct. 31, 1984 [JP] Japan ................................. 59-227962

[51] Int. Cl.⁴ ............................................. G06F 15/46
[52] U.S. Cl. ................................... 364/476; 364/188;
364/558; 425/149; 425/150; 425/170; 425/171;
264/40.5
[58] Field of Search ......................... 364/476, 558, 188;
425/149, 150, 170, 171, 173; 264/40.5, 40.1

[56] References Cited

U.S. PATENT DOCUMENTS

| 3,840,312 | 10/1974 | Paulson et al. | 364/476 |
| 3,860,801 | 1/1975 | Hunkar | 364/476 |
| 3,932,083 | 1/1976 | Boether | 425/149 |
| 3,941,534 | 3/1976 | Hunkar | 425/149 |
| 4,094,940 | 6/1978 | Hold | 364/476 |
| 4,131,596 | 12/1978 | Allen | 425/149 |
| 4,326,255 | 8/1982 | Fujita | 364/476 |
| 4,411,609 | 10/1983 | Yoshii et al. | 425/149 |
| 4,426,341 | 1/1984 | Tsuzuku et al. | 425/170 |
| 4,437,046 | 3/1984 | Faillace | 364/476 |
| 4,493,362 | 1/1985 | Moore et al. | 364/476 |
| 4,504,920 | 3/1985 | Mickowski | 364/476 |
| 4,570,229 | 2/1986 | Breen et al. | 364/476 |
| 4,589,830 | 5/1986 | Clawson | 425/150 |

FOREIGN PATENT DOCUMENTS 0212042 12/1982 Japan ................................. 364/476

Primary Examiner—John R. Lastova
Attorney, Agent, or Firm—Staas & Halsey

[57] ABSTRACT

A monitor device for a screw position and an internal die pressure is used by an injection molding machine for driving a screw (29) by a servo motor (27). During injection, a sequentially updated address from an address generator (20) is supplied to first and second memories (16, 18) through an address switching circuit (21) to designate addresses of the memories (16, 18) so that the output from a pulse counter (15), which represents the screw position, and the output from an analog/digital converter (17), which represents the internal pressure of a die (30), are sequentially stored in the first and second memories (16, 18). During monitoring, the values stored in the first and second memories (16, 18) are read out through the address switching circuit (21) which has performed switching, and the relationship between the screw position and the internal die pressure is displayed on a display unit (25).

2 Claims, 2 Drawing Sheets

MONITOR DEVICE OF INJECTION MOLDING MACHINE

BACKGROUND OF THE INVENTION

The present invention relates to a monitor device of an injection molding machine for monitoring a relationship between the screw position and the internal die pressure.

In conventional injection molding machines, the screw is moved in the axial direction using hydraulic pressure to perform injection. The screw position is detected by a potentiometer or the like in the injection step, the resin pressure within the die is detected by a sensor, and the relationship between the screw position and the internal die pressure is monitored as a reference for changing injection conditions, such as injection speed, of the next injection.

SUMMARY OF THE INVENTION

It is an object of the present invention to provide an injection molding machine which uses a servo motor as a drive source for an injecting operation, which is controlled by numerical control, and which allows the type of monitoring described above.

In order to achieve the above object, according to the present invention, there is provided a monitor device used in an injection molding machine which performs injection by moving a screw along the axial direction using a servo motor. The monitor device comprises a detector for detecting a screw position, a counter for counting pulses from the detector, a first memory for storing the count of the counter, an internal die pressure sensor for detecting a pressure in a die, an analog/digital converter for converting a pressure detection signal from the internal die pressure sensor into a digital signal, a second memory for storing an output from the analog/digital converter, an address switching circuit for switching an address for accessing the first and second memories in accordance with write and read modes, an address generator for generating a sequentially updated address, and a display unit. During injection, the count of the counter and the output from the analog/digital converter are sequentially stored at addresses in the first and second memories which are sequentially designated by the output from the address generator supplied through the address switching circuit. The counts stored in the first and second memories are read out in response to a monitor command through the address switching circuit which has performed switching, and a relationship between the screw position and the internal die pressure is displayed on the display unit.

In this manner, according to the present invention, in an injection molding machine using a servo motor for moving the screw in the axial direction so as to perform injection, the screw position and the internal die pressure are sequentially updated and stored upon injection, so that the relationship between the screw position and the internal die pressure can be monitored whenever it is necessary. The screw position is detected by a detector, such as a pulse coder, provided on the servo motor which moves the screw. Therefore, an exact screw position can be detected with a simple structure.

DESCRIPTION OF THE PREFERRED EMBODIMENTS

Figures 1, 1A:
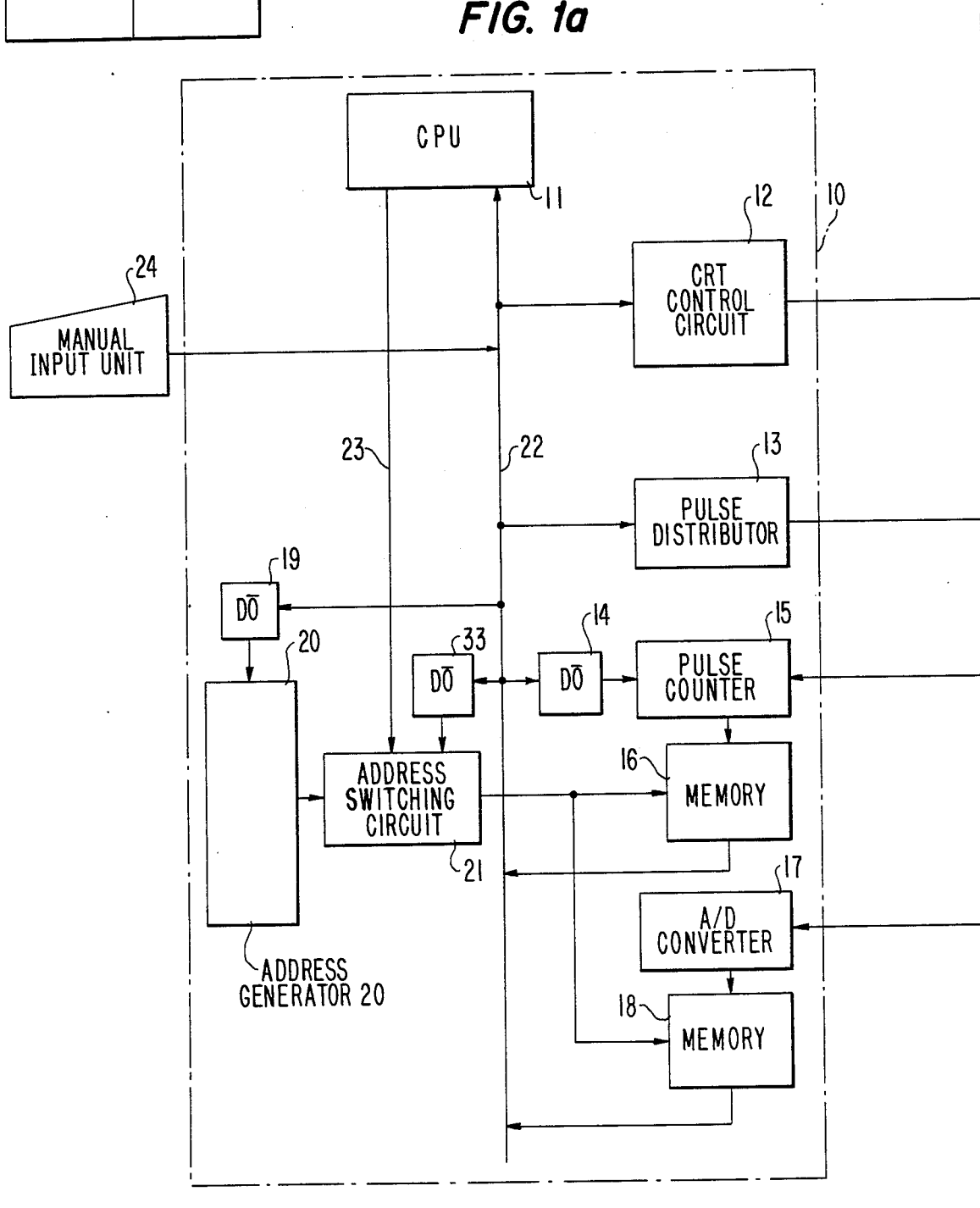
FIGS. 1, 1a, and 1b are block diagrams of a monitor device according to an embodiment of the present invention.
Figure 1B:
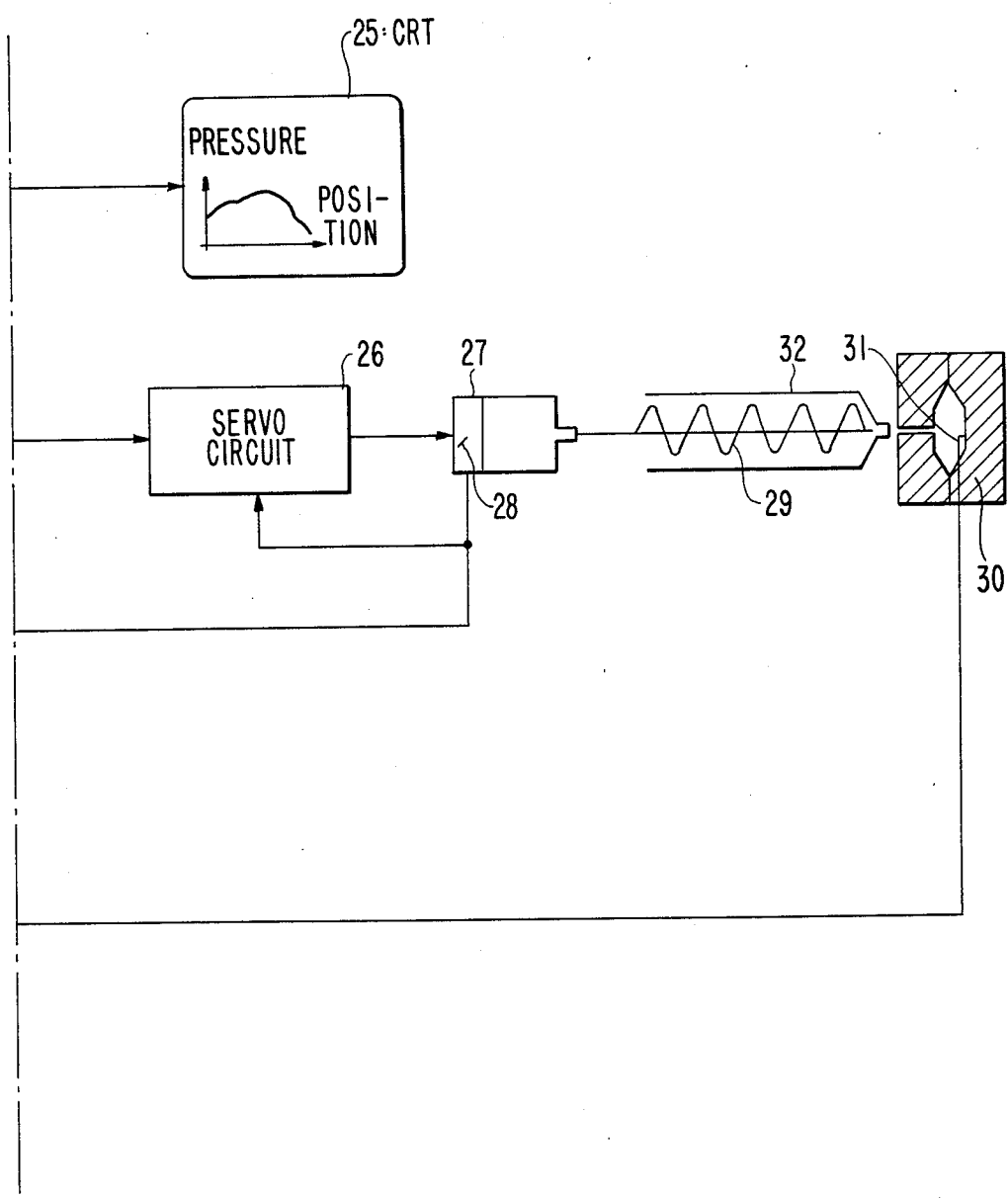

FIGS. 1a and 1b are block diagrams showing an embodiment of the present invention. A numerical controller 10 controls the injection molding machine. Only the part of the numerical controller 10 which is concerned with the present invention is shown. A central processing unit 11 controls the injection molding machine in accordance with a control program stored in a memory (not shown). A CRT control circuit 12 displays the relationship between a screw position and an internal die pressure, to be described later, on a CRT display unit 25. A pulse distributor 13 supplies pulses to a servo circuit 26 in order to drive a servo motor 27 and move a screw 29 of the injection molding machine in the axial direction, thereby injecting an injection material within a heating cylinder 32 into a die 30. Note that the servo circuit 26 receives feedback pulses from a position detector 28, such as a pulse coder, provided on the servo motor 27, and controls the position and speed of the servo motor 27, i.e., the position and speed of the screw 29.

A pulse counter 15 is cleared by a command from the CPU 11 via an output circuit 14, and then counts the pulses from the detector 28. An address generator 20 is cleared by a command from the CPU 11 via an output circuit 19, and outputs an address updated in synchronism with a clock signal from, e.g., a clock signal generator (not shown) incorporated in the address generator 20. The address generator 20 can be connected to address input ports of memories 16 and 18, respectively, through an address switching circuit 21 which operates in response to the command from the CPU 11. The address switching circuit 21 performs a switching operation in response to the command from the CPU 11 via an output circuit 33, in order to switch the connection of the address input ports of the memories 16 and 18 from the address generator 20 to the CPU 11.

An analog-digital converter (to be referred to as an A/D converter hereinafter) 17 converts an analog signal from an internal die pressure sensor 31 for detecting a pressure in the die 30 into a digital signal, and stores the digital signal in the memory 18. With the above arrangement, address signals which are output from the address generator 20 and which are updated sequentially, are supplied to the memories 16 and 18 simultaneously. As a result, the current count of the pulse counter and the current internal die pressure are stored in the memories 16 and 18, respectively. Note that reference numeral 22 denotes a data bus; 23, an address bus; and 24, a manual input unit provided on an operation panel or the like of the numerical controller 10. The manual input unit 24 is connected to the bus 22 via an input circuit (not shown).

The operation of the embodiment of the present invention will be described.

When the injection molding machine performs injection, the CPU 11 operates the servo circuit 26 through the pulse distributor 13 in order to drive the servo motor 27, thereby moving the screw 29 forward to start injection. At the start of injection, the CPU 11 sends a command to the pulse counter 15 and the address generator 20, through the output circuits 14 and 19, in order to clear the contents thereof. Thereafter, the address generator 20 generates address signals sequentially updated from 0, and designates addresses which increase sequentially from address 0 in the memories 16 and 18 through the address switching circuit 21. In this state, the address switching circuit 21 is switched to the address generator side (write mode). The pulse counter 15 sequentially counts and supplies the pulses from the detector 28 to the memory 16. The A/D converter 17 converts the pressure from the internal die pressure sensor 31 into a digital signal and outputs the digital signal to the memory 18. As a result, every time the address generator 20 generates an address, the memory 16 stores the current count of the pulse counter 15, i.e., the position of the screw, at the designated address, and the memory 18 stores the current value of the A/D converter, i.e., the internal die pressure. This operation is repeated during injection.

In monitoring, when a monitor command is input from the manual input unit 24, the CPU 11 outputs a switching signal to the address switching circuit 21 through the output circuit 33, and switches the address switching circuit 21 to the CPU side (read mode) so as to allow access to the memories 16 and 18. The CPU 11 outputs an address signal to the address switching circuit 21 through the address bus 23 in order to obtain required data at respective time points for a graph display, thereby sequentially designating required addresses of the memories 16 and 18. As a result, the count of the pulse counter stored at the corresponding address, i.e., the screw position, is read out from the memory 16, and an internal die pressure stored at the corresponding address is read out from the memory 18. The CPU 11 performs a required operation on the basis of the readout data. A control output in accordance with the operation result is supplied to the CRT display unit 25 through the CRT control circuit 12, so that the relationship between the screw position and the internal die pressure is displayed as a graph on the screen of the CRT display unit 25.

What is claimed is:

1. A monitor device of an injection molding machine having a die, which performs injection by moving a screw along an axial direction using a servo motor controlled by a numerical controller having a central processing unit for supplying a clear command and a switching signal, comprising:
   a detector for detecting a screw position, said detector being coupled to the servo motor for generating pulses with rotation of the servo motor;
   an internal die pressure sensor for detecting a pressure in the die and for generating a pressure detection signal indicative of the detected pressure;
   an analog/digital converter, coupled to said internal die pressure sensor, for converting the pressure detection signal from said internal die pressure sensor into a digital pressure signal and for outputting the digital pressure signal;
   a counter, coupled to said detector and the central processing unit, for counting the pulses from said detector, the count of said counter being updated each time a pulse is generated by said detector and cleared when said counter receives the clear command supplied from the central processing unit upon start to injection;
   an address generator, coupled to the central processing unit, for generating an address signal which is sequentially updated in accordance with clock signals, said address generator being cleared upon reception of the clear command and outputting an initial address signal;
   a first memory having a plurality of addresses, said first memory being coupled to said counter for storing the count of said counter at a predetermined point in time, in a corresponding one of the plurality of addresses of said first memory;
   a second memory having a plurality of addresses, said second memory being coupled to said analog/digital converter, for storing the digital pressure signal output by said analog/digital converter at a predetermined pint in time, in a corresponding one of said plurality of addresses of said second memory;
   command means for supplying said central processing unit with a monitor command;
   an address switching circuit arranged to selectively assume one of first and second switching positions, for connecting, at the first switching position, said first and second memories with said central processing unit, and connecting, at the second switching position, said first and second memories with said address generator, said address switching circuit assuming the first switching position in response to the switching signal supplied from said central processing unit upon generation of the monitor command by said command means; and
   a display unit, coupled to said first and second memories, for displaying the data stored in said first and second memories, so that during injection the count of said counter indicative of the screw position at predetermined points in time and the digital pressure signal output from said analog/digital converter and indicative of the internal die pressure at predetermined points in time, are respectively stored at corresponding addresses in said first and second memories which are sequentially designated by the output from said address generator supplied through said address switching circuit, the counts and the digital pressure signals stored in said first and second memories at the plurality of points in time during injection are read out in response to the monitor command which controls switching of said address switching circuit by designating the memory address by an output of the central processing unit, and a relationship between the screw position and the internal die pressure is displayed on said display unit.

2. A device according to claim 1, wherein said display unit comprises a CRT graphic display unit for displaying the screw position and the internal die pressure as a graph.

* * * * *

UNITED STATES PATENT AND TRADEMARK OFFICE
CERTIFICATE OF CORRECTION

PATENT NO. : 4,774,675
DATED : SEPTEMBER 27, 1988
INVENTOR(S) : YOSHIMASA KAGAWA

It is certified that error appears in the above-identified patent and that said Letters Patent is hereby corrected as shown below:

Col. 4, line 5, "to" should be --of--;

line 21, "pint" should be --point--.

Signed and Sealed this

Tenth Day of January, 1989

Attest:

DONALD J. QUIGG

*Attesting Officer*     *Commissioner of Patents and Trademarks*